United States Patent [19]

Usmani

[11] Patent Number: 4,944,780
[45] Date of Patent: Jul. 31, 1990

[54] CENTRAL VACUUM CLEANER WITH DETACHABLE FILTER ASSEMBLY

[76] Inventor: Kal Usmani, 11 Morningdew Dr., Brantford, Ontario, Canada, N3R 3P1

[21] Appl. No.: 311,807

[22] Filed: Feb. 17, 1989

[30] Foreign Application Priority Data

Jan. 12, 1989 [CA] Canada .................................. 588134

[51] Int. Cl.⁵ .......................................... B01D 50/00
[52] U.S. Cl. ..................................... 55/337; 55/459.1; 55/498; 15/353
[58] Field of Search ...................... 55/459.1, 337, 498; 15/353

[56] References Cited

U.S. PATENT DOCUMENTS

| | | | |
|---|---|---|---|
| 1,396,939 | 11/1921 | Miller | 55/459.1 |
| 2,364,877 | 12/1944 | Smellie | 55/337 |
| 2,719,596 | 10/1955 | Kent et al. | 15/347 |
| 2,943,698 | 7/1960 | Bishop | 55/459.1 |
| 3,240,000 | 3/1966 | Hayes et al. | 55/459.1 |
| 3,308,609 | 3/1967 | McCulloch et al. | 55/337 |

*Primary Examiner*—Bernard Nozick
*Attorney, Agent, or Firm*—Patrick J. Hofbauer

[57] ABSTRACT

The present invention relates in part to a cyclonic separator type central vacuum cleaner assembly comprising four mutually detachable sub-assemblies, including:

(a) a first sub-assembly comprising a vacuum motor/exhaust housing having at one end thereof an opening through which air is drawn into the housing by the operation of the vacuum motor;

(b) a second, mid-section, sub-assembly comprising a housing which is adapted to be secured to means for supporting the vacuum cleaner assembly as installed, and a vacuum cleaner inlet adapted to be secured to a system of dust collecting ductwork;

(c) a third sub-assembly comprising a dust collecting housing for receiving and holding dust released from a cyclonic airflow during the operation of the vacuum cleaner assembly; and, (d) a fourth sub-assembly comprising a base plate adapted to be secured in removably fixed relation between said first sub-assembly and the second sub-assembly and having an aperture therein for permitting the flow of air between the first and second sub-assemblies;

and further including a bracket which is adapted to receive and secure a filter and which includes means adapted to engage at least a portion of the base plate adjacent the aperture therein such that a filter secured thereon is positioned in in-line filtering relation between the first and second sub-assemblies.

3 Claims, 1 Drawing Sheet

U.S. Patent    Jul. 31, 1990    4,944,780
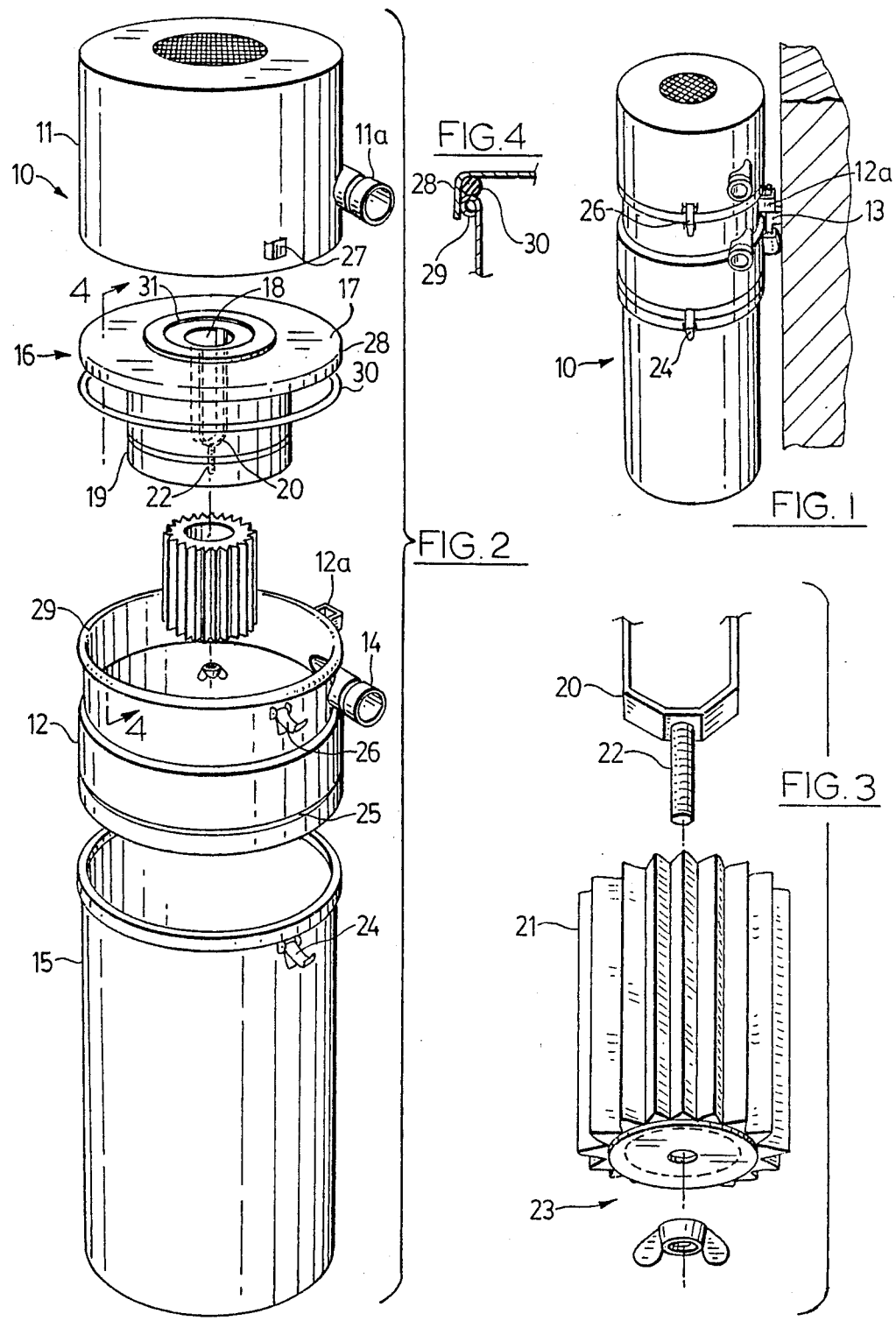

CENTRAL VACUUM CLEANER WITH DETACHABLE FILTER ASSEMBLY

The present invention relates to improvements in domestic vacuum cleaners, and in particular to central vacuum systems based on cyclonic air-flow separators.

Central vacuum systems for domestic applications have captured a significant portion of the portable household vacuum cleaner market. These systems are based on a ducting arrangement installed throughout the household, which is accessible to the user through a series of wall outlets adapted to receive one end of a flexible vacuum hose, which in turn is connected through it's other end to a rigid wand. The wand is adapted to be connected to a variety of cleaning tools, each especially suited to specific cleaning tasks. The ducting converges at a central location within the house, usually in a utility room, garage or basement, where a dust-collector and vacuum motor device are located.

Typically, such devices depend for their operation on the principles described in "AIR CONDITIONING and REFRIGERATION" by Severns et al, (see pages 334 et seq.), in relation to the so-called "change of direction air-flow cleaning devices." These are essentially cyclonic separators in which the aerosol inlet is directed tangentially along the curved interior surface of a cylindrical separation chamber. This arrangement allows inertial forces of the air flow itself to augment gravitational settling of air-borne dirt and dust particles and the like, within the separation chamber. The action of the centrifugal forces on the particulate matter, and the reversal of the direction of the air flow as it escapes from the separation chamber affects the removal of the preponderance of the air-borne solids. While this is very effective for removing relatively large particulates, some fines are nevertheless carried along with the exiting air-flow and must be filtered out in the interests of protecting the vacuum motor and preventing the particles from being dispersed as aerosols back into the household environment. In order for this filtration to be carried out efficiently, a filter must be placed in the air flow, downstream of the cyclonic separation. This prevents the filter from becoming prematurely overburdened with particles that are large enough to be removed effectively through the action of the cyclone while at the same time positioning the filter to remove fines for the purposes described above. Consequently, the filter is usually located within what is sometimes referred to as a vortex finder.

A vortex finder typically takes the form of a skirt, downwardly depending from the upper end of the cylindrical separation chamber. The aerosol inlet directs the incoming, particulate laden air-flow tangentially along the curved inner surface of the cylindrical separation chamber, usually adjacent the upper end thereof and in between the curved interior surface of the separation chamber and the exterior of the downwardly depending skirt of the vortex finder. In this arrangement, the particulate laden air-flow moves in a spiral down the length of the cylindrical separation chamber, progressively loosing velocity and most of it's particulate load in the process. Once the flow reaches the base of the separation chamber, the air-flow changes direction and spirals upwardly within the vortex created by the down-flow. Finally the upwardly moving flow enters the interior of the vortex finder through the open end of the depending skirt thereof, passes through the filter located therein, and exits the separation chamber.

One of the problems encountered in central vacuum cleaners arises in connection with emptying dust from the separation chamber, and removing the vacuum motor for servicing.

Attempts at addressing these shortcomings in earlier designs have included the introduction of a central vacuum cleaner assembly based on three sub-assemblies. The midsection sub-assembly mounts to a vertical support, usually a wall, and in turn supports the other two sub-assemblies. This midsection assembly also forms the uppermost portion of the separation chamber, and includes the aerosol inlet and the vortex finder with a mounting bracket for the filter, all as an integral unit. It is also attached to the central manifold of the duct work that services the various rooms in the house. The lowermost of the three sub-assemblies forms the largest and lowermost portion of the separator chamber, while the uppermost sub-assembly comprises the vacuummotor.

This arrangement facilitates the removal of dust and dirt trapped in the lower portion of the separator chamber, and makes removal and servicing of the vacuum motor much easier. Unfortunately, this arrangement does nothing to simplify filter replacement or cleaning. Because the filter mounting is integral with the midsection sub-assembly, which in turn is fixed to the wall or other support, the filter is difficult to access for cleaning or replacement. Often, a user must crawl underneath the midsection sub-assembly and work above his/her head in order to service the filter. Quite apart from being at best a dirty task, this arrangement also occasions a potential health hazard for someone not properly equipped with appropriate dust mask and eye protection. In addition, the removal of the filter often allows dust and dirt trapped on it's surface to become dislodged and to fall to the floor, thereby further compounding the cleanup operation.

It is an object of the present invention to address these unresolved problems that remain associated with filter servicing in central vacuum cleaners.

Broadly speaking, the present invention relates to a removable filter mounting bracket adapted for use in a cyclonic separator type vacuum cleaner comprising three mutually detachable sub-assemblies including a mid-section sub-assembly, itself adapted to be secured to means, such as a wall for example, for supporting said vacuum cleaner as installed for use, an uppermost detachable vacuum motor/exhaust housing sub-assembly and a lowermost detachable dust collecting housing sub-assembly. The removable filter mounting bracket is arranged to be separable from said mid-section sub-assembly and can be removed, with the filter member installed thereon, from above the end of the mid-section sub-assembly that is adapted to be secured to the uppermost sub-assembly. The filter mounting bracket comprises means for securing a filter member thereto, and may also include a base plate having an aperture therein which is adapted to permit the passage of air drawn by the action of said vacuum motor, from the interior of said filter member into an inlet in said uppermost sub-assembly from which said air is finally exhausted.

In accordance with one aspect of the present invention, there is provided a vacuum cleaner assembly comprising three mutually detachable sub-assemblies, including a first, uppermost sub-assembly adapted to be attached to an uppermost end of a second, midsection sub-assembly and comprising a vacuum motor and exhaust housing with a base plate and a downwardly depending filter mounting bracket secured thereto, wherein said bracket is adapted to secure a filter member in the path of a flow of air produced during and by the operation of said vacuum, between said first sub-assembly and the attached second sub-assembly through an aperture in said base plate. Said filter member is thereby positionable in in-line filtering relation within an open-ended vortex finder adapted to extend into the interior of said second sub-assembly adjacent a vacuum cleaner inlet, and in register with the aperture in said base plate. The third sub-assembly in this aspect of the present invention comprises a detachable dust collecting housing, adapted to be secured to the lowermost end of said second sub-assembly.

Optionally, the downwardly depending, open-ended, and preferably generally cylindrical, vortex finder is fixed at one end thereof to the baseplate of said exhaust housing. The vortex finder itself comprises a skirt member, fixed at the one end thereof to said base plate, and being open to the interior of said second sub-assembly at the other, downwardly depending end.

In either case, said filter bracket together with a filter member secured thereto are removable from the interior of said second sub-assembly as part of said first, detachable, assembly. Said filter bracket is preferably located such that the filter member is positionable in substantially co-axial register with both said vortex finder and said base plate aperture.

While this arrangement is advantageous at least to the extent of overcoming the disadvantages referred to hereinabove, it is not without some of it's own shortcomings, in that the weight of the vacuum motor makes manipulation of the first sub-assembly awkward during the servicing of the filter.

Accordingly, there is provided in accordance with another aspect of the present invention, a cyclonic separator type vacuum cleaner assembly comprising four mutually detachable sub-assemblies, including a first sub-assembly comprising a vacuum motor/exhaust housing having at one end thereof an opening through which air is drawn into the housing by the operation of the vacuum motor. A second, mid-section, sub-assembly comprises a housing which is adapted to be secured to means for supporting said vacuum cleaner assembly as installed, and a vacuum cleaner inlet adapted to be secured to a system of dust collecting ductwork. The third sub-assembly comprises a dust collecting housing for receiving and holding dust released from the cyclonic airflow during the operation of the vacuum cleaner assembly. A forth sub-assembly comprises a base plate adapted to be secured in removably fixed relation between said first sub-assembly and said second sub-assembly and having an aperture therein for permitting the flow of air between the first and second sub-assemblies.

Preferably, the fourth sub-assembly further includes a downwardly depending vortex finder which comprises an open-ended generally cylindrical baffle with one open end thereof being secured in generally concentric relation over the aperture in said base plate.

In one embodiment of the preceding aspect of the present invention, there is included a bracket which is adapted to receive and secure a filter and which includes means adapted to engage at least a portion of said base plate adjacent said aperture therein. Said bracket is adapted to be positioned through said aperture so as to depend from and be supported by said base plate. In accordance with a preferred embodiment the bracket is adapted to be so supported within the interior of the cylindrical baffle of said vortex finder.

In a particularly preferred embodiment of this aspect of the present invention, such a bracket is secured in fixed relation to the base plate and depends therefrom into the interior of the cylindrical baffle of the vortex finder even though the invention includes within its scope arrangements in which the bracket is removably positionable through said aperture.

Also included as an aspect of the present invention is a kit including a filter mounting bracket suitable for mounting within a mid-section of a cyclonic type vacuum cleaner, from above the end thereof that is adapted to be secured to a first, uppermost sub-assembly of such a vacuum cleaner. This provides the benefit of being able to retrofit existing vacuum cleaners in a manner which allows the owner thereof to secure the advantages of the present invention.

Reference will be made hereinafter to the various drawings appended hereto, in which:

FIG. 1 is an elevated perspective view of a typical, fully assembled, stylized vacuum cleaner of the present invention.

FIG. 2 is an enlarged, exploded perspective view of the vacuum cleaner depicted in FIG. 1, showing the details of a particularly preferred embodiment of the present invention, in situ.

FIG. 3 is an enlarged perspective view showing some of the construction details of a preferred filter mounting bracket of the present invention.

FIG. 4 is a partial cross-sectional view taken at line "4" through a portion of the embodiment of the present invention that is illustrated in FIG. 2.

Referring now to the drawings generally, there is provided in accordance with a preferred embodiment of the present invention, a cyclonic separator type vacuum cleaner assembly, 10, comprising four mutually detachable sub-assemblies, including a first sub-assembly, 11, comprising a vacuum motor/exhaust housing having at one end thereof an opening, (not shown), through which air is drawn into sub-assembly 11 by the operation of the vacuum motor housed therein, (also not shown). Sub-assembly 11 also includes an exhaust duct 11a from which air exits the assembly 10. A second, mid-section, sub-assembly, 12, comprises a housing which is adapted to be secured through a wall bracket, 12a, to means, 13, for supporting said vacuum cleaner assembly 10 as installed, and a vacuum cleaner inlet, 14, adapted to be secured to a system of dust collecting ductwork, (not shown). The third sub-assembly, 15, comprises a dust collecting housing for receiving and holding dust released from the cyclonic airflow during the operation of the vacuum cleaner assembly 10. A fourth sub-assembly, 16, comprises a base plate, 17, adapted to be secured in removably fixed relation between said first sub-assembly 11 and said second sub-assembly 12 and having an aperture, 18, therein for permitting air to flow between the first and second sub-assemblies, 11 and 12 respectively. The fourth sub-assembly 16 further includes a downwardly depending vortex finder, 19, which comprises an open-ended generally cylindrical baffle with one open end thereof being secured in generally concentric relation over aperture 18 in said base plate 17. There is also included a bracket, 20, which is adapted to receive and secure a filter, 21, and which is itself adapted to be secured in fixed relation to base plate 17 proximal to aperture 18. Bracket 20 is thereby positioned to depend from base plate 17, into the interior of the cylindrical baffle of vortex finder 19. Filter 21, preferably formed with a suitable paper or foam cone, is secured to bracket 20 through the cooperation of a threaded terminal portion 22 of said bracket 20, and a washer and wing-nut shown generally by reference numeral 23. When installed in the vacuum cleaner assembly the secured filter 21 is positioned in substantially co-axial register with the interior of the baffle of vortex finder 19 and aperture 18.

Sub-assembly 15 is adapted to be detachably secured to sub-assembly 12 through clips, 24, born adjacent the uppermost end of sub-assembly and designed to engage portions of a groove, 25, on sub-assembly 12.

Similar clips, 26, located in fixed relation on sub-assembly 12 are adapted to mutually secure sub-assemblies 11 and 12 in detachable relation, through means of brackets, 27, adapted to engage clips 26 in secured relation for that purpose. With sub-assemblies 11 and 12 so secured, sub-assembly 16 is also engaged therebetween in mutually secured relation as shown in cross-section in FIG. 4 of the drawings. A downwardly depending periphery, 28, of base plate 17 is adapted to be able to engage in interfitting relation with a knurled upper edge, 29, of sub-assembly 12, with a resilient gasket 30 disposed therebetween in order to preserve the integrity of the vacuum drawn during the operation of the vacuum cleaner assembly 10. Gasket 30 may also have a role in vibration damping during the operation of the vacuum motor. Sub-assembly 16 includes a further resilient gasket, 31, borne on the upper surface of base plate 17, which further gasket 31 is adapted primarily to preserve the vacuum drawn during operation, against leakage between the juncture of sub-assemblies 11 and 16, adjacent aperture 18.

In operation, vacuum assembly 10 draws a vacuum at the instance of the vacuum motor located in sub-assembly 11, which vacuum creates an air flow upstream thereof in the aforementioned dust collecting duct work connected to the vacuum assembly 10 through inlet 14 located on sub-assembly 12. Air flows from the ductwork into the inlet 14, and is introduced as a tangential flow within the interior of sub-assembly 12, between a portion of the interior surface thereof and the exterior surface of vortex finder 19. The flow looses velocity, and consequently the preponderance of any dust entrained in the flow, as the flow increases in cross-sectional area and follows a generally downwardly spiral path adjacent the interior cylindrical surfaces of sub-assemblies 12 and 15. Near the enclosed bottom of the latter, the circular flow is reversed in known manner and the flow begins an upward spiral within the vortex of the above-mentioned downward spiral, until the upward spiral enters the interior of vortex finder 19. The flow then passes through filter 21, where many of the filterable fines are removed from the flow, and then passes through aperture 18 and enters sub-assembly 11, to be finally exhausted through exhaust duct 11a.

When it comes time for the filter 21 to be cleaned or replaced, the clips 26 securing sub-assemblies 11 and 12 are released by the user and sub-assembly 11 can be lifted clear of the balance of vacuum assembly 10. Sub-assembly 16 can then be easily lifted clear of sub-assembly 12, and inverted to permit ready access to filter 21 within the vortex finder 19. Wing nut and washer, 23, can be simply removed and the filter extracted from off of bracket 20, for cleaning or replacement as the case may require.

I claim:

1. A cyclonic-separator type central vacuum cleaner comprising releasably secured sub-assemblies including:
   a motor/exhaust housing sub-assembly having an exhaust outlet, and housing a fan motor and a vacuum inducing fan operably connected in driven relation therewith, said housing having a substantially open bottom;
   a substantially open topped and open bottomed vacuum inlet sub-assembly, adapted to be secured to a vacuum cleaner-supporting horizontal surface, and releasably secured in axial register with said substantially open bottom of said motor/exhaust housing sub-assembly, said vacuum inlet sub-assembly comprising a cylindrical body having a tangential air inlet arranged adjacent the substantially open top thereof;
   a substantially open topped dust collecting sub-assembly releasably secured in axial register with the open bottom of said vacuum inlet sub-assembly;
   an in-line-filter-supporting vortex finder comprising a plate releasably secured in removable clamped relation intermediate between said motor/exhaust housing and vacuum inlet sub-assemblies, said plate defining a septum between the open base and the open top of the respective ones of the motor/exhaust housing and vacuum inlet sub-assemblies and having a generally centrally located aperture communicating between opposed sides of said plate and opening on one side thereof into a cylindrical vortex finder that is secured at a first end thereof to said one side of said plate, and extends downwardly from said one side into the interior of said vacuum inlet sub-assembly to terminate below said tangential air inlet at a second open end, in inlet airflow deflecting relation;
   wherein filter mounting means is fixed to said vortex finder with a demountable filter secured thereto in vortex finder supported relation, said filter being shielded by said cylindrical vortex finder and arranged therein in operative inline filtering relation of an airflow passing from within said cylindrical vortex finder and through said aperture, that is induced between said inlet and said exhaust outlet by the operation of said vacuum inducing fan.
   whereby, with the motor/exhaust housing sub-assembly removed from said vacuum cleaner and the plate thereby released from said secured clamped relation, said vortex finder is upwardly removable from said vacuum inlet sub-assembly with said filter transported therein in shielded relation, to permit said vortex finder to be inverted and the filter demounted from said filter mounting means without undue release of dust into a surrounding living space.

2. The vacuum cleaner assembly according to claim 1 wherein said filter mounting means comprises a generally "U" shaped bracket having axially extending arms joined, respectively, in spaced apart relation on said plate at respective first ends of said arms, and being mutually secured at second respective ends thereof.

3. The vacuum cleaner assembly according to claim 2 wherein said filter mounting means is adapted to receive one end of an open ended, hollow-bodied, generally cylindrical filter with said supporting arms extending through the interior of the filter member in fixed, releasably secured relation to a transverse disc adapted to close the other end of said filter.

* * * * *